US012649568B2

(12) United States Patent
Bodki et al.

(10) Patent No.: US 12,649,568 B2
(45) Date of Patent: Jun. 9, 2026

(54) LANDING GEAR ADD-ON ENERGY ABSORPTION SYSTEM

(71) Applicant: GOODRICH CORPORATION, Charlotte, NC (US)

(72) Inventors: Basavaraj Bodki, Bangalore (IN); Hemanth M N, Hassan (IN); Kyle M. Madey, Broadview Hts, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 377 days.

(21) Appl. No.: 18/451,966

(22) Filed: Aug. 18, 2023

(65) Prior Publication Data

US 2025/0002143 A1 Jan. 2, 2025

(30) Foreign Application Priority Data

Jun. 27, 2023 (IN) .............................. 202341043161

(51) Int. Cl.
| | |
|---|---|
| B64C 25/62 | (2006.01) |
| B64C 25/60 | (2006.01) |
| F16F 9/19 | (2006.01) |
| F16F 9/342 | (2006.01) |

(52) U.S. Cl.
CPC .............. B64C 25/62 (2013.01); B64C 25/60 (2013.01); F16F 9/19 (2013.01); F16F 9/342 (2013.01); *F16F 2222/12* (2013.01)

(58) Field of Classification Search
CPC .. B64C 25/60; B64C 25/62; F16F 9/19; F16F 9/342; F16F 2222/12
USPC ................................ 188/289, 322.13, 322.15
See application file for complete search history.

(56) References Cited

U.S. PATENT DOCUMENTS

| | | | | |
|---|---|---|---|---|
| 2,109,891 | A | * | 3/1938 | Wallace .................. B64C 25/60 |
| | | | | 188/269 |
| 2,587,016 | A | | 2/1952 | Watts |
| 3,499,621 | A | | 3/1970 | Boehringer et al. |
| 3,763,970 | A | * | 10/1973 | Anderson ............... F16F 9/443 |
| | | | | 188/315 |

(Continued)

FOREIGN PATENT DOCUMENTS

| | | |
|---|---|---|
| CN | 206374975 | 8/2017 |
| EP | 3939883 | 1/2022 |

OTHER PUBLICATIONS

European Patent Office, European Search Report dated Nov. 28, 2024 in Application No. 24184285.5.

*Primary Examiner* — Christopher P Schwartz
(74) *Attorney, Agent, or Firm* — SNELL & WILMER L.L.P.

(57) ABSTRACT

A shock strut assembly is disclosed herein. The shock strut assembly includes a shock strut cylinder defining a mixed fluid chamber, a shock strut piston defining a liquid chamber, the shock strut piston operatively coupled to slide within the shock strut cylinder, an orifice support tube coupled to the shock strut cylinder and defining an orifice between the liquid chamber and the mixed fluid chamber, a retainer housing coupled to the orifice support tube and configured to restrict a flow of liquid from the liquid chamber to the mixed fluid chamber, a spring retainer coupled to the orifice support tube and disposed over the retainer housing, and a spring disposed between the retainer housing and the spring retainer.

17 Claims, 8 Drawing Sheets

(56)     References Cited

U.S. PATENT DOCUMENTS

| | | | | |
|---|---|---|---|---|
| 5,303,804 | A * | 4/1994 | Spiess | F16F 9/465 |
| | | | | 188/266.8 |
| 5,423,402 | A * | 6/1995 | de Kock | F16F 9/465 |
| | | | | 188/315 |
| 5,944,283 | A * | 8/1999 | Carter, Jr. | B64C 25/00 |
| | | | | 188/289 |
| 8,162,112 | B2 | 4/2012 | Gartner et al. | |
| 8,235,186 | B2 * | 8/2012 | Holt | F16F 9/512 |
| | | | | 188/313 |
| 12,110,945 | B2 * | 10/2024 | Sankaran | F16F 9/34 |
| 2003/0010587 | A1 * | 1/2003 | Eroshenko | F16F 9/003 |
| | | | | 188/314 |
| 2011/0079476 | A1 | 4/2011 | Holt et al. | |
| 2024/0182162 | A1 * | 6/2024 | Bodki | F16F 9/342 |
| 2024/0317392 | A1 * | 9/2024 | Allen | B64C 25/60 |
| 2024/0343385 | A1 * | 10/2024 | Bodki | B64C 25/60 |
| 2024/0409207 | A1 * | 12/2024 | M N | B64C 25/60 |
| 2025/0026471 | A1 * | 1/2025 | M N | B64C 25/60 |

* cited by examiner

200

204

213

214

202

228

232

220

250

226

208

222

224

212

230

210

206 w2 w1

Z

Y  X

250

214

228

256

252

254

228a

254a

H1

204

258

220

226

222

212

LANDING GEAR ADD-ON ENERGY ABSORPTION SYSTEM

CROSS-REFERENCE TO RELATED APPLICATIONS

This application claims priority to, and the benefit of, India Provisional Patent Application No. 202341043161, filed Jun. 27, 2022 and titled "LANDING GEAR ADD-ON ENERGY ABSORPTION SYSTEM," which is incorporated by reference herein in its entirety for all purposes.

FIELD

The present disclosure generally relates to aircraft landing systems and, more particularly, to systems and methods to improve shock strut performance.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. The shock struts used in the landing gear of aircraft generally are subject to more demanding performance specifications than many ground vehicle shock absorbers. In particular, shock struts control motion of the landing gear, and absorb and dampen loads imposed on the landing gear during braking, landing, taxiing, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

While shock struts may effectively absorb energy during aircraft landing events, "hard-landing events" may result in structural damage to the aircraft and/or landing gear assemblies. A landing event is conventionally deemed "hard" (i.e., a hard-landing event) when there is a spike in pressure in the shock strut that exceeds an upper design pressure threshold. This may also be referred to as an overloading event.

SUMMARY

Disclosed herein is a shock strut assembly. The shock strut assembly includes a mixed fluid chamber, an orifice coupled to the mixed fluid chamber, a liquid chamber coupled to the mixed fluid chamber by the orifice, the orifice allowing a liquid to flow from the liquid chamber to the mixed fluid chamber, a spring retainer disposed adjacent the orifice, and a spring disposed in the spring retainer, the spring configured to compress in response to a pressure in the liquid chamber exceeding an upper threshold, the compression of the spring lowering the pressure in the liquid chamber.

In various embodiments, the shock strut assembly further includes a shock strut cylinder defining the mixed fluid chamber and a shock strut piston defining the liquid chamber, the shock strut piston operatively coupled to slide within the shock strut cylinder. In various embodiments, the shock strut assembly further includes an orifice support tube coupled to a shock strut cylinder and defining the orifice and a gap defined by the spring retainer and the orifice support tube and configured to house the spring, wherein the spring retainer is configured to slide with respect to the orifice support tube.

In various embodiments, the shock strut assembly further includes a retainer housing disposed adjacent the spring retainer and an orifice plate disposed between the retainer housing and the spring retainer. In various embodiments, the orifice plate is configured to float freely between the retainer housing and the spring retainer. In various embodiments, the spring includes a plurality of coned-disc springs. In various embodiments, the spring retainer is configured to translate as the spring compresses, the translation decreasing the pressure in the liquid chamber.

Also disclosed herein is a shock strut assembly including a shock strut cylinder defining a mixed fluid chamber, a shock strut piston defining a liquid chamber, the shock strut piston operatively coupled to slide within the shock strut cylinder, an orifice support tube coupled to the shock strut cylinder and defining an orifice between the liquid chamber and the mixed fluid chamber, a retainer housing coupled to the orifice support tube and configured to restrict a flow of liquid from the liquid chamber to the mixed fluid chamber, a spring retainer coupled to the orifice support tube and disposed over the retainer housing, and a spring disposed between the retainer housing and the spring retainer.

In various embodiments, the spring includes a plurality of coned-disc springs. In various embodiments, the shock strut assembly further includes an orifice plate disposed between the retainer housing and the spring retainer, the orifice plate configured to float between the retainer housing and the spring retainer. In various embodiments, further including a plurality of openings formed through the orifice support tube above the retainer housing and adjacent the spring retainer.

In various embodiments, the shock strut assembly further includes a metering pin configured to extend through the orifice and restrict a flow of a liquid from the liquid chamber to the mixed fluid chamber in response to a pressure in the liquid chamber being below an upper threshold. In various embodiments, the spring is configured to compress in response to the pressure in the liquid chamber exceeding the upper threshold. In various embodiments, the spring is pre-loaded during installation to compress in response to a pressure in the liquid chamber exceeding an upper threshold.

Also disclosed herein is a landing gear assembly including a shock strut, a wheel assembly coupled to the shock strut, and an energy absorption system coupled to the shock strut. The energy absorption system includes a shock strut cylinder defining a mixed fluid chamber, a shock strut piston defining a liquid chamber, the shock strut piston operatively coupled to slide within the shock strut cylinder, an orifice support tube coupled to the shock strut cylinder and defining an orifice between the liquid chamber and the mixed fluid chamber, a retainer housing coupled to the orifice support tube and configured to restrict a flow of liquid from the liquid chamber to the mixed fluid chamber, a spring retainer coupled to the orifice support tube and disposed over the retainer housing, and a spring disposed between the retainer housing and the spring retainer.

In various embodiments, the spring includes a plurality of coned-disc springs. In various embodiments, the landing gear assembly further includes an orifice plate disposed between the retainer housing and the spring retainer, the orifice plate configured to float between the retainer housing and the spring retainer. In various embodiments, the landing gear assembly further includes a metering pin configured to extend through the orifice and restrict a flow of a liquid from the liquid chamber to the mixed fluid chamber in response to a pressure in the liquid chamber being below an upper threshold.

In various embodiments, the spring is configured to compress in response to the pressure in the liquid chamber exceeding the upper threshold. In various embodiments, the spring is pre-loaded during installation to compress in response to a pressure in the liquid chamber exceeding an upper threshold.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
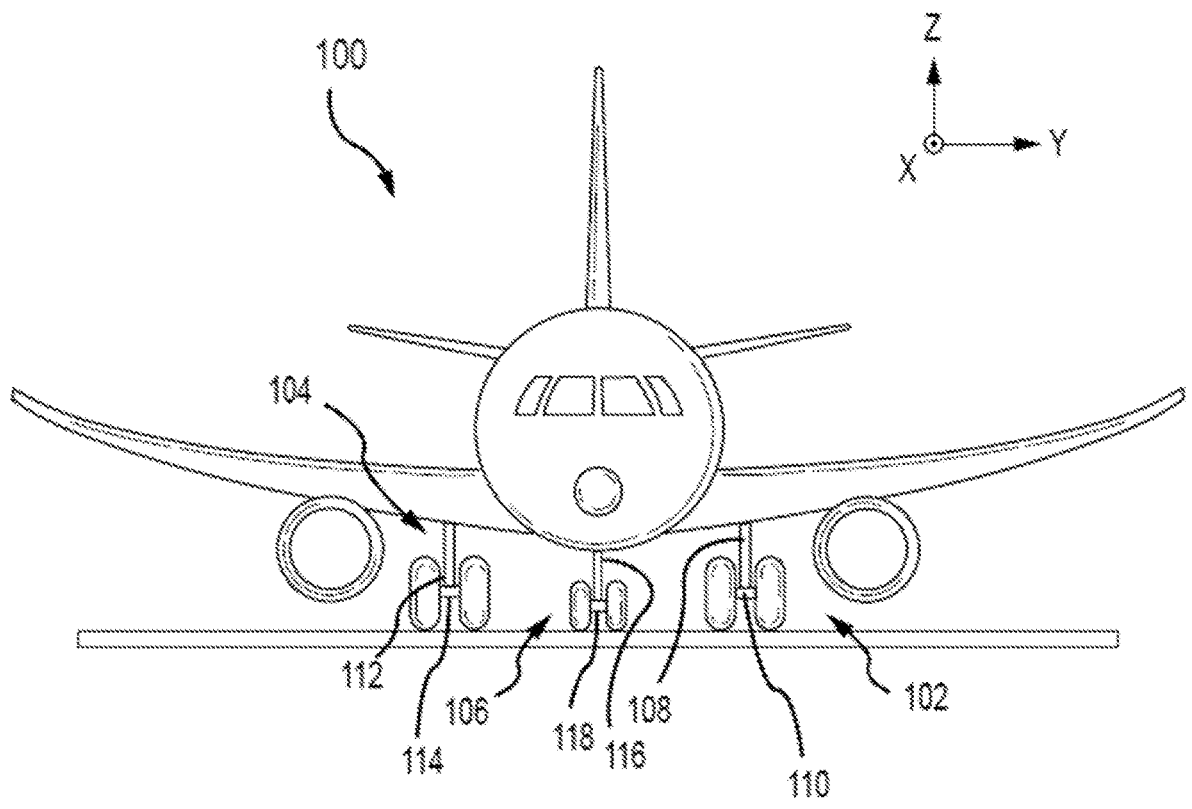
FIG. 1 illustrates an exemplary aircraft having landing gear, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an energy absorption system that, in various embodiments, may be added to a landing gear assembly. In various embodiments, the energy absorption system may be included in a shock struct of the landing gear assembly. In various embodiments, the energy absorption system may absorb, or trim, pressure spikes that exceed an upper design pressure threshold, such as may occur during a touchdown event. In various embodiments, the energy absorption system includes a spring and a spring retainer disposed in a shock strut and adjacent a flow path of liquid from a liquid chamber to a mixed fluid chamber. In various embodiments, the energy absorption system may be engaged when the liquid pressure in the liquid chamber meets or exceeds the upper design pressure threshold. In various embodiments, upon reaching the upper design pressure threshold, the energy absorption system, and more specifically, the spring compresses to absorb the spike in pressure.

In various embodiments, the spring includes one or more coned-disc springs (e.g., Belleville washers sold by the Belleville company) that are stacked and supported by the spring retainer. In various embodiments, the spring may be preloaded to ensure that the spring does not compress further until the upper design pressure threshold is reached. In various embodiments, as the pressure exceeds the upper design pressure threshold, the spring compresses to reduce, and in various embodiments eliminate, the spike in pressure that occurs during a hard touchdown event. Reducing pressure spikes prevents damage to the landing gear, the shock strut, the aircraft, and/or the passengers.

The energy absorption system disclosed herein may function to prevent pressure spikes at any stroke length of the shock strut. In various embodiments, the energy absorption system disclosed herein automatically resets, or repositions, itself after the pressure drops below the upper design pressure threshold. In various embodiments, the shock strut may be retrofitted to include the energy absorption system. The energy absorption system disclosed herein may be used in landing gears and shock struts of all sizes and does not alter the designed performance of the landing gears at normal operating ranges.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Figure 2B:
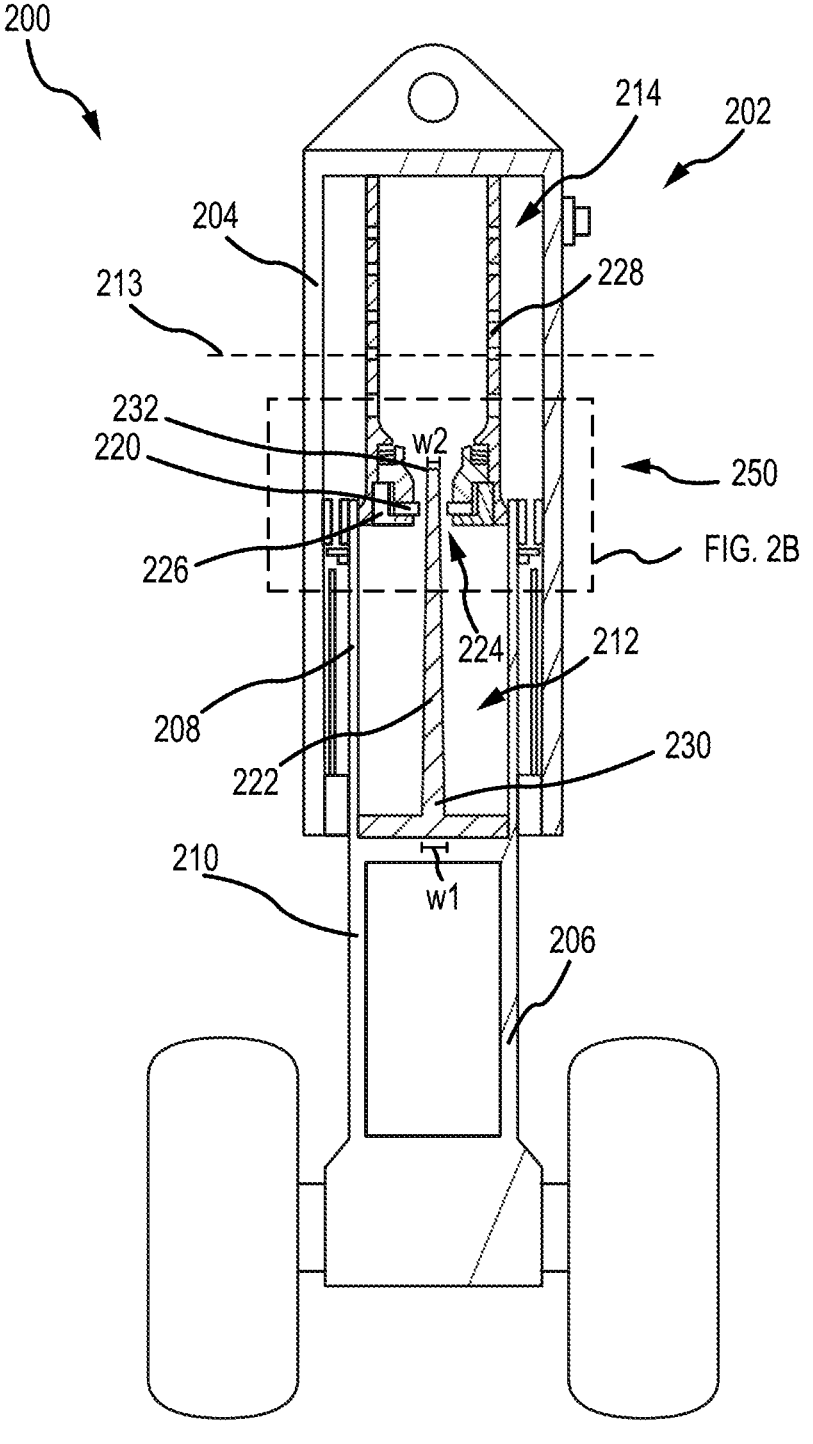
FIGS. 2A and 2B illustrate various mechanical components of a shock strut landing gear assembly, in accordance with various embodiments.
Figure 2A:
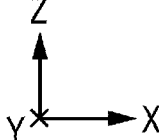
Figure 2B:
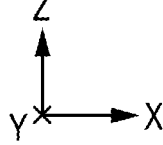

Referring now to FIGS. 2A and 2B, a landing gear assembly 200, similar to the landing gear assemblies described above with reference to FIG. 1, is illustrated. FIG. 2A illustrates a cross section of landing gear assembly 200 and FIG. 2B illustrates an enlarged cross section of a portion of landing gear assembly 200. In accordance with various embodiments, landing gear assembly 200 includes a shock strut 202, which itself may include a shock strut cylinder 204 and a shock strut piston 206. Shock strut piston 206 is operatively coupled to slide or telescope within shock strut cylinder 204. Shock strut piston 206 may include a first end 208 disposed within shock strut cylinder 204 and a second end 210 extending from shock strut cylinder 204. Shock strut cylinder 204 may be configured to receive shock strut piston 206 in a manner that allows the two components to telescope together and absorb and dampen forces transmitted thereto. FIG. 2A illustrates shock strut 202 in an extended position. When in a compressed position, shock strut piston 206 will have translated, or slid, a distance (e.g., in the positive z-direction) into shock strut cylinder 204 from that illustrated in FIG. 2A.

Shock strut cylinder 204 may be divided into a liquid chamber 212 and a mixed fluid chamber 214 as indicated by a line 213. In various embodiments, a liquid, such as, for example, hydraulic fluid or oil may be located within liquid chamber 212. Further, a gas, such as nitrogen or air, may be located within mixed fluid chamber 214. In various embodiments, shock strut 202 includes an orifice plate 220 configured to separate liquid chamber 212 (also referred to herein as a first chamber or a dynamic liquid chamber) from mixed fluid chamber 214 (also referred to herein as a second chamber or a mixed gas/liquid chamber). In this regard, during operation, the liquid, such as, for example, hydraulic fluid or oil, may be located within liquid chamber 212 (or the first or dynamic liquid chamber) and a mixture of a gas, such as, for example, nitrogen or air, and the liquid, may be located within mixed fluid chamber 214 (or the second or mixed gas/liquid chamber).

Shock strut 202 includes a metering pin 222 coupled to shock strut piston 206 and configured to translate with shock strut piston 206. In various embodiments, metering pin 222 is received by and extends through orifice plate 220. Orifice plate 220 may comprise a metering pin aperture 224 configured to receive metering pin 222. In various embodiments, metering pin 222 includes a metering flute (or a plurality of metering flutes) disposed along the length (e.g., along the Z-direction) of the metering pin 222. As described herein, the metering flute defines a flow channel between metering pin 222 and metering pin aperture 224 of orifice plate 220 through which liquid may travel from liquid chamber 212 to mixed fluid chamber 214 in response to shock strut 202 moving to a compressed position from an extended position. In various embodiments, metering pin 222 is tapered having a first end 230 (e.g., the negative z-direction) and a second end 232 (e.g., the positive z-direction) with first end 230 being wider than second end 232. That is, first end 230 of metering pin 222 has a first width w1 and second end 232 of metering pin 222 has a second width w2 that is smaller than first width w1. Accordingly, the width of metering pin 222 may gradually decrease from w1 at first end 230 to width w2 at second end 232.

In various embodiments, orifice plate 220 is housed within a retainer housing 226 and may include a retainer plate. Both orifice plate 220 and the retainer plate are typically annular in shape and secured to an orifice support tube 228. Retainer housing 226 and, in various embodiments the retainer plate, are configured to restrict, but not prevent, the flow of fluid (e.g., liquid and/or gas) from liquid chamber 212 into mixed fluid chamber 214 during compression of shock strut 202. Orifice plate 220 may translate away from retainer housing 226 during compression of shock strut 202 and translate toward retainer housing 226 during extension of shock strut 202. In various embodiments, orifice plate 220 may be free to move within a channel formed in the orifice retainer plate.

Shock strut 202 further includes an energy absorption system 250. Energy absorption system 250 includes a spring 252 and a spring retainer 254. Spring retainer 254 is located inside of and adjacent to orifice support tube 228. Spring retainer 254 and orifice support tube 228 define a gap 256 in which spring 252 is located. In various embodiments, spring retainer 254 may be located adjacent to retainer housing 226. In various embodiments, spring retainer 254 is in physical contact with orifice support tube 228 and retainer housing 226. Gap 256 has a height H1 extending from an upper surface 254a of spring retainer 254 to a lower surface 228a of orifice support tube 228. Height H1 may be about 0.25 inches (about 0.635 centimeter) to about 10 inches (about 25.4 centimeters), and more specifically about 1 inch (about 2.54 centimeters) to about 5 inches (about 12.7 centimeters). In various embodiments, height H1 may be larger based on predetermined design parameters for shock strut 202.

There is a gap 258 between spring retainer 254 and orifice plate 220 (e.g., in the z-axis). Gap 258 allows orifice plate 220 to freely float between retainer housing 226 and spring retainer 254. In various embodiments, gap 258 may be about 0.005 inches (about 127 micrometers) to about 0.030 inches (about 762 micrometers), and more specifically about 0.007 inches (about 178 micrometers) to about 0.020 inches (about 508 micrometers). As shock strut 202 compresses, shock strut piston 206 translated upward (e.g., in the positive z-direction) into shock strut cylinder 204. This causes metering pin 222 to translate upward (e.g., in the positive z-direction) relative to retainer housing 226 and liquid to flow from liquid chamber 212 through metering pin aperture 224 into mixed fluid chamber 214. Orifice plate 220 moves vertically (e.g., along the z-axis) in response to the flow of liquid from liquid chamber 212 to mixed fluid chamber 214. Accordingly, orifice plate 220 may float between orifice support tube 228 and spring retainer 254 to passively control the flow of liquid through metering pin aperture 224.

Spring 252 may be a coned-disc spring, a conical spring washer, a disc spring, cupped spring washer, a Belleville spring, a helical spring, a dampener material, or a compressive spring, among others. In various embodiments, spring 252 may include one or more springs that are stacked, nested, or otherwise assembled together to absorb, or resist, the upward movement (e.g., in the positive z-direction) of shock strut piston 206, metering pin 222, and/or the liquid in liquid chamber 212.

Figure 3B:
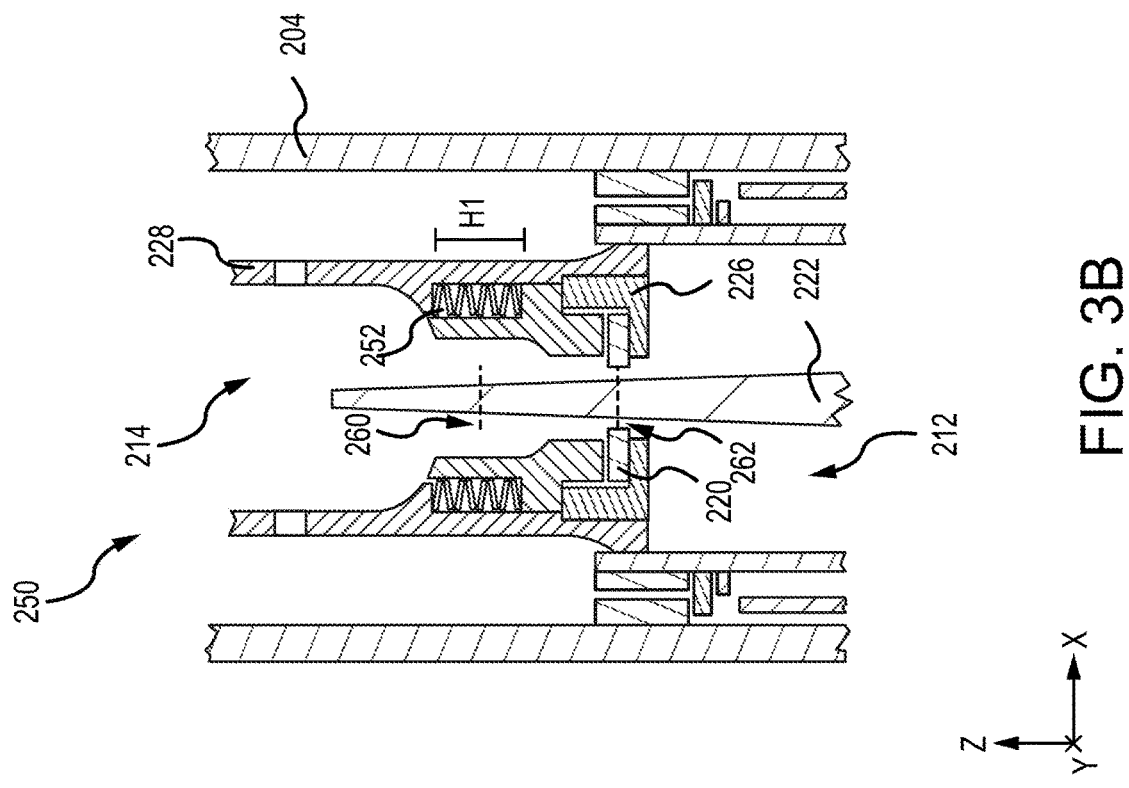
FIGS. 3A, 3B, and 3C illustrate an energy absorption system for use in a shock strut, in accordance with various embodiments.
Figure 3A:
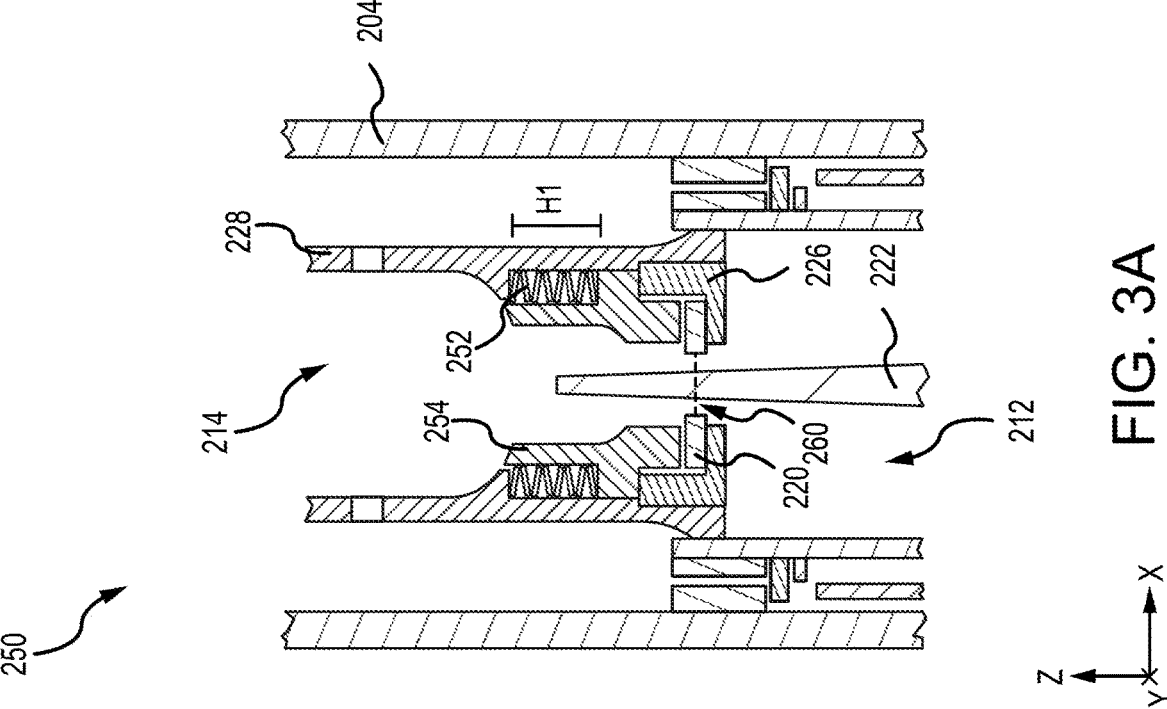
Figure 3C:
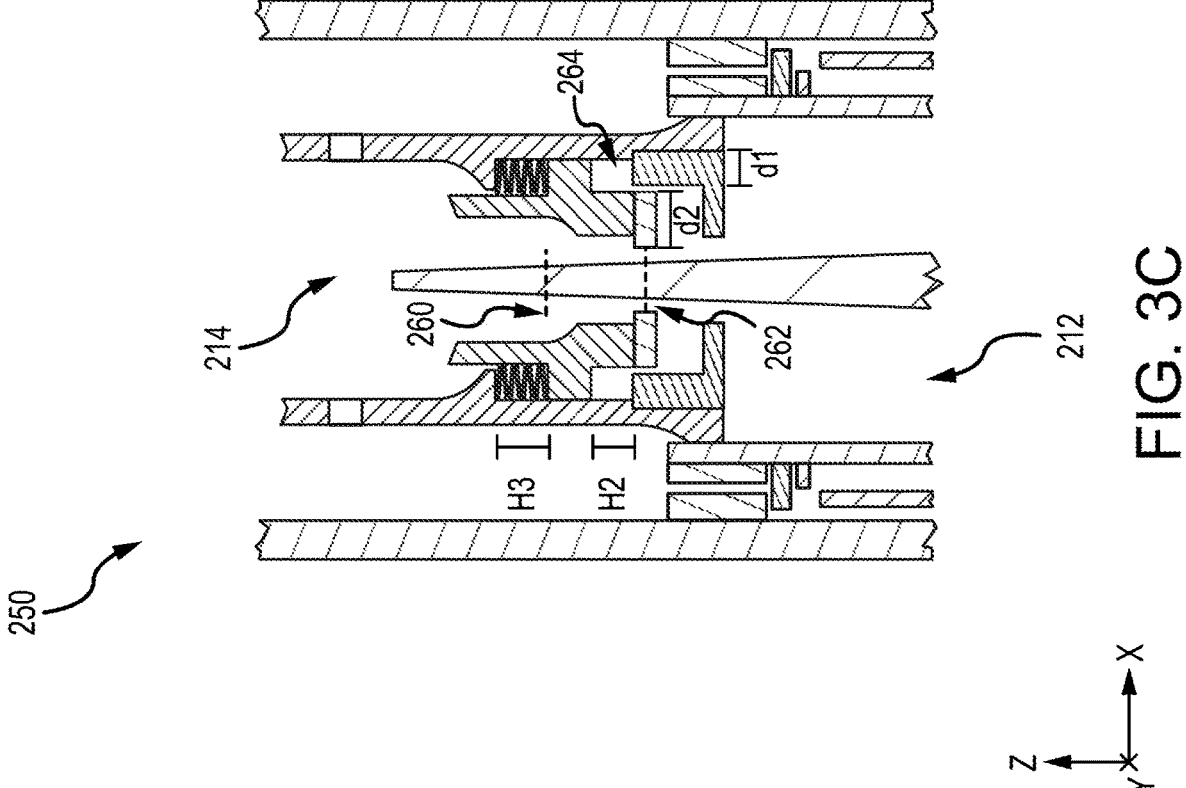

Referring now to FIGS. 3A-3C, illustrated are energy absorption system 250, in accordance with various embodiments. FIG. 3A illustrates energy absorption system 250 experiencing low pressures during normal operating conditions for shock strut 202 (e.g., normal operating pressures). FIG. 3B illustrates energy absorption system 250 experiencing medium to high pressures during normal operating conditions for shock strut 202. FIG. 3C illustrates energy absorption system 250 experiencing high pressures during an overload operating conditions for shock strut 202 (e.g., pressure exceeding an upper designed pressure threshold). Illustrated in FIGS. 3A-3C are a first line 260 and a second line 262 that are present for illustration and discussion purposes only and are not components in energy absorption system 250.

As illustrated in FIG. 3A, shock strut 202 is operating under normal operating parameters. That is, the change in the pressure of the liquid in liquid chamber 212 remains below an upper designed pressure threshold. Additionally, first line 260 indicates a portion of metering pin 222 that aligns with orifice plate 220. Energy absorption system 250 does not absorb pressure or limit the flow of liquid. In the normal operating state, springs 252 may be preloaded to the upper designed pressure threshold +/−5 pounds per square inch (3.45e+04 newtons/square meter) (psi). In this preloaded state, spring 252 has a height H1 that is about 0.25 inches (about 0.635 centimeter) to about 10 inches (about 25.4 centimeters), and more specifically about 1 inch (about 2.54 centimeters) to about 5 inches (about 12.7 centimeters). In various embodiments, height H1 may be larger based on predetermined design parameters for shock strut 202. Being preloaded, spring 252 does not compress until the liquid in liquid chamber 212 reaches the upper designed pressure threshold.

As illustrated in FIG. 3B, during a landing event, metering pin 222 translates upward (e.g., in the positive z-direction) with respect to orifice plate 220 and retainer housing 226. As illustrated, first line 260 moves upward with metering pin 222 and second line 262 now aligns with orifice plate 220. This illustrates the displacement of metering pin 222 with respect to orifice plate 220 and retainer housing 226. In various embodiments, orifice plate 220 may float freely between retainer housing 226 and spring retainer 254.

As metering pin 222 translates upward, the cross section of metering pin 222 that is aligned with orifice plate 220 increases (e.g., cross section at second line 262 as compared to cross section at first line 260). The increase in cross-section decreases the flow of liquid from liquid chamber 212 to mixed fluid chamber 214 and increases the liquid pressure in liquid chamber 212. This action provides the dampening, or shock resistance, of shock strut 202 during normal operations.

As illustrated in FIG. 3C, during a hard landing event, the pressure in liquid chamber 212 has increased above the upper designed pressure threshold of shock strut 202. Energy absorption system 250, and more specifically, spring 252 compresses in response to the pressure in liquid chamber 212 exceeding the upper designed pressure threshold. In turn, spring retainer 254 and orifice plate 220 translate upward (e.g., in the positive z-direction) with respect to retainer housing 226. This is illustrated as second line 262 remaining aligned with orifice plate 220 while a gap 264 is created between spring retainer 254 and retainer housing 226. Gap 264 has a second height H2 that is about 0.1 to about 0.7 times first height H1, and more specifically, about 0.4 to about 0.6 times first height H1 at full compression. Spring 252 compresses to a third height H3 that is about the difference between first height H1 and second heigh H2. Retainer plate 226 includes a vertical portion coupled to orifice tube 228 that has a first diameter d1 and orifice plate 220 has a second diameter d2. First diameter d1 may be modified to be larger or smaller to accommodate orifice plate 220. Diameter d2 may be modified to be larger or smaller to control an amount of liquid that flows from liquid chamber 212 to mixed gas chamber 214.

While FIG. 3C illustrates energy absorption system 250 fully engaged, and more specifically, spring 252 fully compressed, it should be understood that energy absorption system 250 may compress between 0% and 100% of full compression in response to a lending event. That is, energy absorption system 250, and more specifically, spring 252 compresses to an amount that is between 0% and 100% of full compression in response to a spike in pressure in liquid chamber 212.

Figures 4A, 4B:
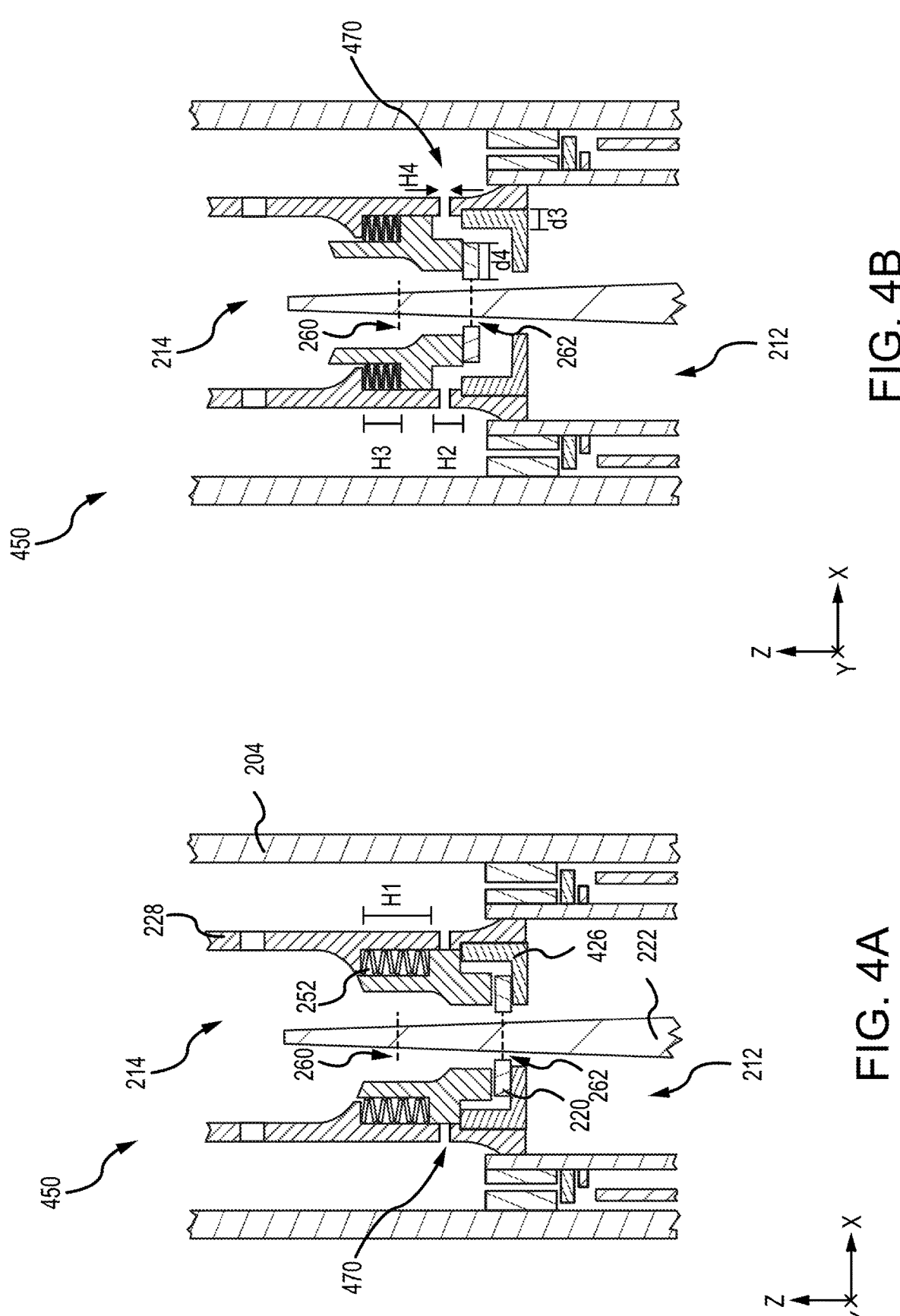
FIGS. 4A and 4B illustrate an energy absorption system for use in a shock strut, in accordance with various embodiments.

Referring now to FIGS. 4A and 4B, illustrated are energy absorption system 450, in accordance with various embodiments. In various embodiments, energy absorption system 450 may be an example of energy absorption system 250 described above. FIG. 4A illustrates energy absorption system 450 experiencing medium to high pressures during normal operating conditions for shock strut 202 (similar to FIG. 3B). FIG. 4B illustrates energy absorption system 450 experiencing high pressures during an overload operating conditions for shock strut 202 (e.g., pressure exceeding an upper designed pressure threshold) (similar to FIG. 3C). Energy absorption system 450 includes similar components to those described above with respect to energy absorption system 250 in FIGS. 2A, 2B, and 3A-3C, including a shock strut, shock strut cylinder 204, a shock strut piston, a first end, a second end, liquid chamber 214, mixed gas chamber 214, an orifice plate 220, a metering pin 222, a retainer housing 426, an orifice support tube 228, and a spring 252. Similar to the description above, illustrated in FIGS. 4A and 4B are a first line 260 and a second line 262 that are present for illustration and discussion purposes only and are not components in energy absorption system 450. Energy absorption system 450 further includes openings 470 that are formed through orifice support tube 228.

Openings 470 provide an additional path for the liquid in liquid chamber 212 to flow to further reduce pressure spikes. Openings 470 are configured to prevent the flow of liquid through opening 470 during typical pressure situations (as illustrated in FIG. 4A). Openings are further configured to allow the flow of liquid through openings 470 during pressure spikes (as illustrated in FIG. 4B). In various embodiments, openings 470 may include a plurality of individual openings formed in orifice support tube 228 to ensure the structural integrity of orifice support tube 228. Openings 470 have a height H4 that may be about 0.25 times height H2 to about 0.75 times height H2, and more specifically, about 0.4 times height H2 to about 0.6 times height H2.

Retainer housing 426 includes a vertical portion coupled to orifice support tube 228 that has a third diameter d3. Third diameter d3 may be about 0.75 times first diameter d1 to about 0.9 times diameter d1 to improve a flow of the liquid from liquid chamber 212 through openings 470 to mixed gas chamber 214 to reduce pressure in shock strut 202. Fourth diameter d4 may be about 0.75 times second diameter to about 0.9 times second diameter to improve the flow of the liquid from liquid chamber 212 through openings 470 to mixed gas chamber 214 to reduce pressure in shock strut 202. In various embodiments, third diameter d3 and/or fourth diameter d4 may be adjusted depending on the application.

Figure 5A:
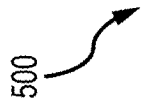
FIGS. 5A and 5B illustrate springs for use in an energy absorption system, in accordance with various embodiments.
Figure 5B:
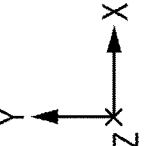

Referring now to FIGS. 5A and 5B, illustrated is a spring 500 for use in energy absorption system 250, in accordance with various embodiments. Spring 500 may be an example of spring 252 as described above with respect to FIGS. 2A-3C. In various embodiments, spring 500 may be a plurality of coned-disc springs, as illustrated in FIGS. 5A and 5B. In the illustrated embodiment, spring 500 includes a first plurality of coned-disc springs 502a-502f interleaved with a second plurality of coned-disc springs 504a-504f. In various embodiments, the coned-disc springs 502a-502f, 504a-504f may be Belleville washers manufactured by the Belleville company.

The first plurality of coned-disc springs 502a-502f are positioned concave up (e.g., open downward in the negative z-direction). The second plurality of coned-disc springs 504a-504f are positioned concave up (e.g., open upward in the positive z-direction). Interleaving the first plurality of coned-disc springs 502a-502f with the second plurality of coned-disc springs 504a-504f may allow for one set of coned-disc springs (e.g., 502a and 504a) to compress while the remaining coned-disc springs (e.g., 502b-502f and 504b-504f) do not compress. As the pressure increases, all the first plurality of coned-disc springs 502a-502f and the second plurality of coned-disc springs 504a-504f may compress, as illustrated in FIG. 5B.

The configuration and orientation of the first plurality of coned-disc springs 502a-502f and the second plurality of coned-disc springs 504a-504f may be different for each aircraft and/or each landing gear assembly. For example, two of the first plurality of cone-disc springs (e.g., 502a and 502b) may be placed adjacent each other and physically contacting with two of the second plurality of cone-disc springs (e.g., 504a and 504b) disposed above the first two (e.g., in the positive z-direction). Any number of configurations are possible, as will be readily understood by one of skill in the art. Accordingly, the configuration of springs may be designed to compress after the pressure in liquid chamber 212 exceeds the upper designed pressure threshold.

Figure 6:
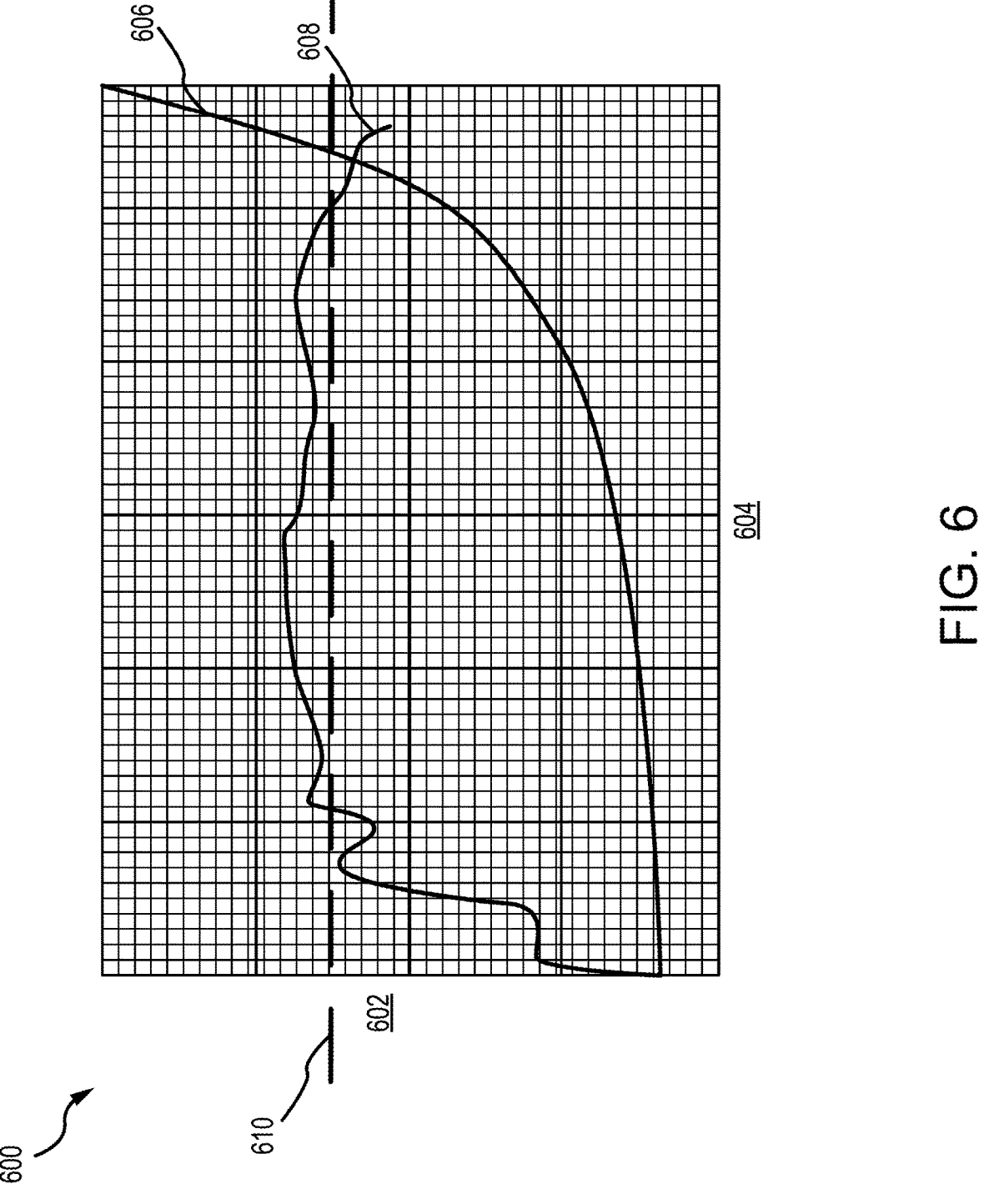
FIG. 6 illustrates a plot of a shock strut load as a function of the shock strut stroke, in accordance with various embodiments.

Referring now to FIG. 6, a plot 600 of a shock strut load 602 (e.g., the y-axis) as a function of the shock strut stroke 604 (e.g., the x-axis) is illustrated, in accordance with various embodiments. Plot 600 may be used to determine an upper designed pressure threshold for shock strut 202, and more specifically, energy absorption system 250. As previously mentioned, each shock strut 202 may have a different upper designed pressure thresholds. A first line 606 illustrates a static shock strut load 602 increasing as the shock strut stroke 604 increases. The area under first line 606 may represent energy absorbed by compressing gas (e.g., nitrogen) within the shock strut. Generally, as the shock strut stroke 604 of shock strut 202 increases (e.g., along the x-axis 604) the shock strut load 602 on shock strut 202 increases in a predictable manner, as illustrated by first line 606. The slope of first line 606 may be different for different shock struts 202.

A second line 608 illustrates a dynamic shock strut load 602 with respect to the increase in shock strut stroke 604. That is, second line 608 illustrates the shock strut load 602 on shock strut 202 during a landing event (or a dynamic event). The area between first line 606 and second line 608 may represent energy absorbed by dynamic dampening, as disclosed herein. As illustrated, the shock strut load 602 may increase dramatically with little to no increase in the stroke of shock strut 202. Again, each shock strut design (e.g., shock strut 202) may have different dynamic characteristics identified by second line 608. A spike in pressure may be defined as a specific shock strut load 602 for each shock strut by using second line 608.

A third line 610 illustrates an upper designed pressure threshold of the shock strut. Any portion of second line 608 that is above third line 610 in plot 600 may be considered a spike in pressure, or a hard landing event. Energy absorption system 250, and more specifically, spring 252 may be designed to absorb and/or mitigate this spike in pressure so that the second line 608 does not rise above third line 610.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A shock strut assembly, comprising:
a mixed fluid chamber;
an orifice coupled to the mixed fluid chamber;
an orifice support tube coupled to a shock strut cylinder and defining the orifice;
a liquid chamber coupled to the mixed fluid chamber by the orifice, the orifice allowing a liquid to flow from the liquid chamber to the mixed fluid chamber;
a spring retainer disposed adjacent the orifice and configured to slide with respect to the orifice support tube;
a gap defined by the spring retainer and the orifice support tube and configured to house the spring; and
a spring disposed in the gap, the spring configured to compress in response to a pressure in the liquid chamber exceeding an upper threshold, the compression of the spring lowering the pressure in the liquid chamber.

2. The shock strut assembly of claim 1, further comprising:
a retainer housing disposed adjacent the spring retainer; and
an orifce plate disposed between the retainer housing and the spring retainer.

3. The shock strut assembly of claim 2, wherein the orifice plate is configured to float freely between the retainer housing and the spring retainer.

4. The shock strut assembly of claim 1, further comprising:
a shock strut cylinder defining the mixed fluid chamber; and
a shock strut piston defining the liquid chamber, the shock strut piston operatively coupled to slide within the shock strut cylinder.

5. The shock strut assembly of claim 1, wherein the spring includes a plurality of coned-disc springs.

6. The shock strut assembly of claim 1, wherein the spring retainer is configured to translate as the spring compresses, the translation decreasing the pressure in the liquid chamber.

7. A shock strut assembly, comprising:
a shock strut cylinder defining a mixed fluid chamber;
a shock strut piston defining a liquid chamber, the shock strut piston operatively coupled to slide within the shock strut cylinder;
an orifice support tube coupled to the shock strut cylinder and defining an orifice between the liquid chamber and the mixed fluid chamber;

a metering pin configured to extend through the orifice and restrict a flow of a liquid from the liquid chamber to the mixed fluid chamber in response to a pressure in the liquid chamber being below an upper threshold;
a retainer housing coupled to the orifice support tube and configured to restrict a flow of liquid from the liquid chamber to the mixed fluid chamber;
a spring retainer coupled to the orifice support tube and disposed over the retainer housing; and
a spring disposed between the retainer housing and the spring retainer.

8. The shock strut assembly of claim 7, wherein the spring includes a plurality of coned-disc springs.

9. The shock strut assembly of claim 7, further comprising:
an orifice plate disposed between the retainer housing and the spring retainer, the orifice plate configured to float between the retainer housing and the spring retainer.

10. The shock strut assembly of claim 7, further comprising:
a plurality of openings formed through the orifice support tube above the retainer housing and adjacent the spring retainer.

11. The shock strut assembly of claim 7, wherein the spring is configured to compress in response to the pressure in the liquid chamber exceeding the upper threshold.

12. The shock strut assembly of claim 7, wherein the spring is pre-loaded during installation to compress in response to a pressure in the liquid chamber exceeding an upper threshold.

13. A landing gear assembly, comprising:
a shock strut;
a wheel assembly coupled to the shock strut; and
an energy absorption system coupled to the shock strut, the energy absorption system including:
a shock strut cylinder defining a mixed fluid chamber;
a shock strut piston defining a liquid chamber, the shock strut piston operatively coupled to slide within the shock strut cylinder;
an orifice support tube coupled to the shock strut cylinder and defining an orifice between the liquid chamber and the mixed fluid chamber;
a retainer housing coupled to the orifice support tube and configured to restrict a flow of liquid from the liquid chamber to the mixed fluid chamber;
a spring retainer coupled to the orifice support tube and disposed over the retainer housing;
an orifice plate disposed between the retainer housing and the spring retainer, the orifice plate configured to float between the retainer housing and the spring retainer; and
a spring disposed between the retainer housing and the spring retainer.

14. The landing gear assembly of claim 13, further comprising:
a metering pin configured to extend through the orifice and restrict a flow of a liquid from the liquid chamber to the mixed fluid chamber in response to a pressure in the liquid chamber being below an upper threshold.

15. The landing gear assembly of claim 14, wherein the spring is configured to compress in response to the pressure in the liquid chamber exceeding the upper threshold.

16. The landing gear assembly of claim 13, wherein the spring includes a plurality of coned-disc springs.

17. The landing gear assembly of claim 13, wherein the spring is pre-loaded during installation to compress in response to a pressure in the liquid chamber exceeding an upper threshold.

\* \* \* \* \*